Feb. 13, 1962 A. G. MAKOWSKI 3,020,594
INJECTION MOLDING
Filed July 11, 1958 3 Sheets-Sheet 1
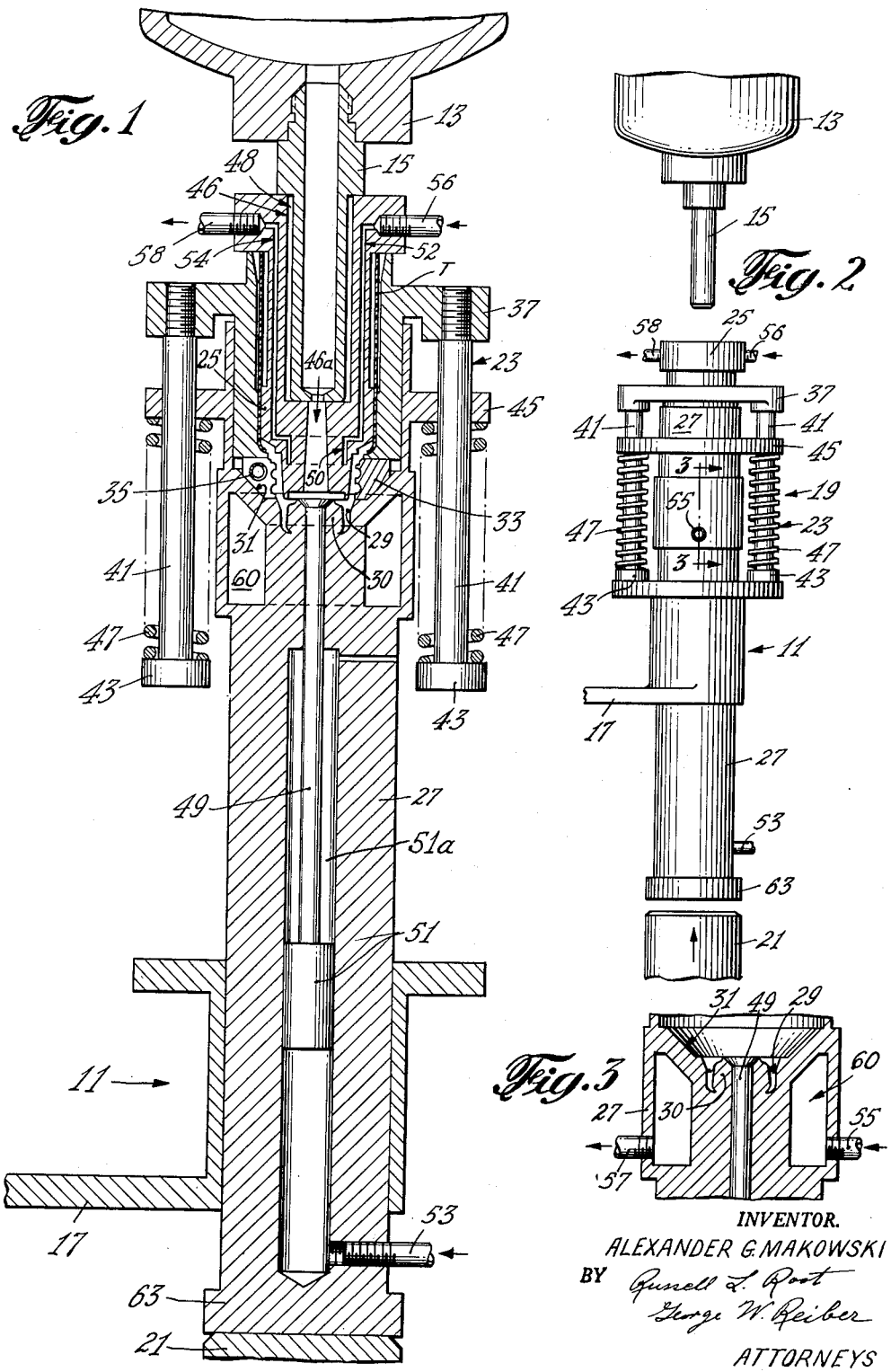
INVENTOR.
ALEXANDER G. MAKOWSKI
BY Russell L. Root
George W. Reiber
ATTORNEYS Feb. 13, 1962 A. G. MAKOWSKI 3,020,594
INJECTION MOLDING
Filed July 11, 1958 3 Sheets-Sheet 2
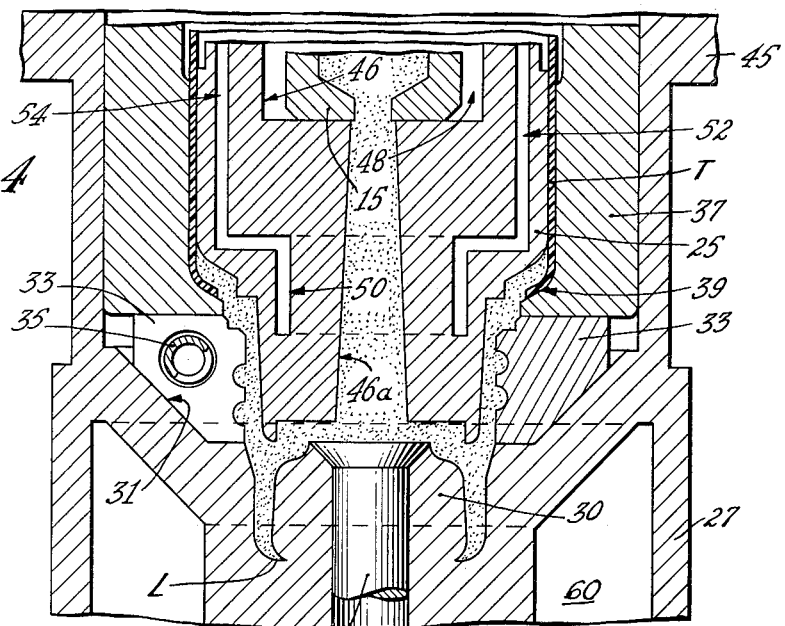
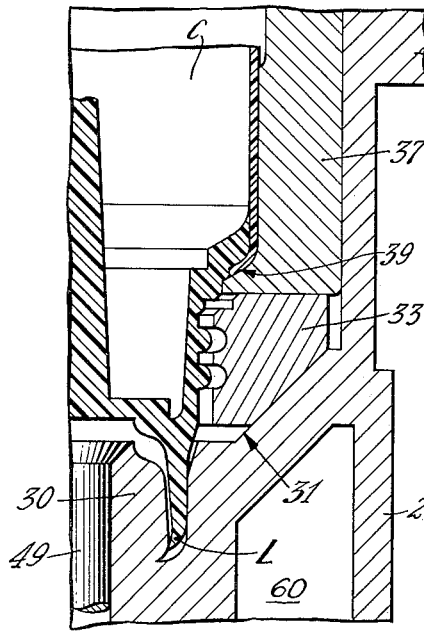
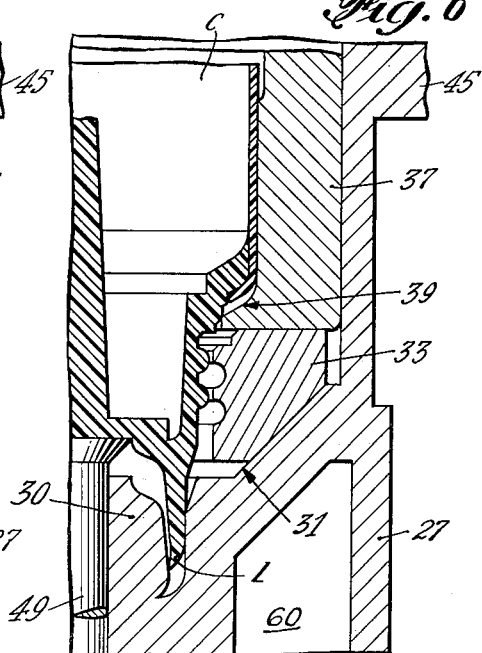
INVENTOR.
ALEXANDER G. MAKOWSKI
BY Russell L. Root
George W. Reiber
ATTORNEYS Feb. 13, 1962  A. G. MAKOWSKI  3,020,594
INJECTION MOLDING
Filed July 11, 1958  3 Sheets-Sheet 3
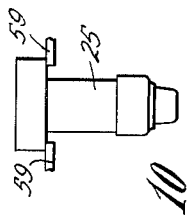
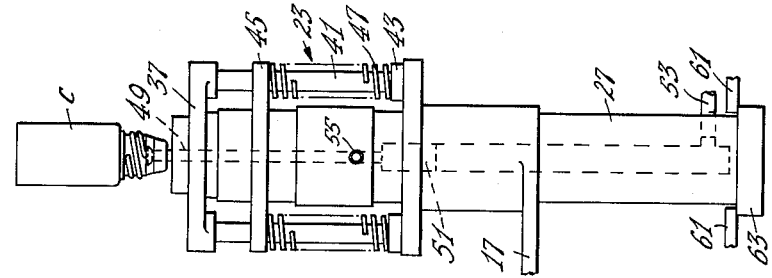
Fig. 10
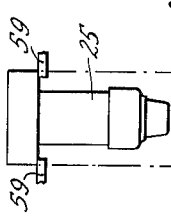
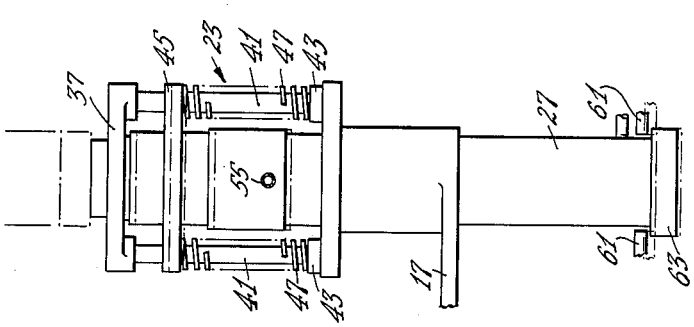
Fig. 9
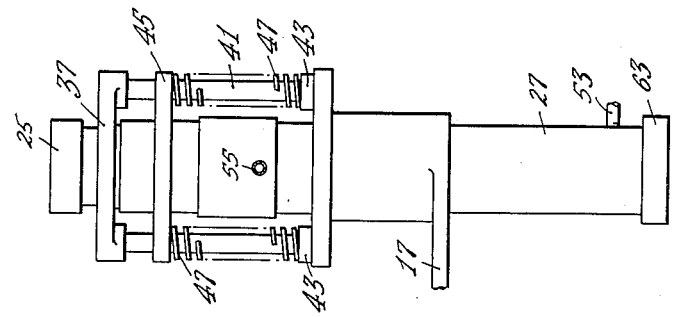
Fig. 8
Fig. 7
INVENTOR.
ALEXANDER G. MAKOWSKI
BY Russell L. Root
George W. Riber
ATTORNEYS

United States Patent Office 3,020,594
Patented Feb. 13, 1962

3,020,594
INJECTION MOLDING
Alexander G. Makowski, Fayville, Mass., assignor, by mesne assignments, to American Can Company, New York, N. Y., a corporation of New Jersey
Filed July 11, 1958, Ser. No. 747,996
14 Claims. (Cl. 18—42)

This invention relates to molding of resilient thermoplastic materials and especially to the rapid, high-production molding and unmolding of pieces which embody in their makeup undercut portions from which a mold part must be forceably stripped.

The invention is particularly illustrated in connection with the manufacture of a container of thermoplastic material such as polyethylene, having an injection molded head including a specially shaped mouth having an inwardly turned lip intended to retain in place a dispensing and applicator element for the contents, such as a sponge or ball applicator. In the formation of such containers heretofore, serious difficulty has been experienced in molding the containers with sufficient speed to make them commercially usable. One the one hand the container head could be molded and the molds held closed sufficiently long to cool the overhanging portion to a firm resilient condition allowing normal removal of the mold part trapped under the overhang, but this called for excessively slow operation of the injection machine, reducing its capacity by perhaps half. An alternative procedure was to open the mold after the head portion was relatively firmly set, but early enough so that stripping of the mold part trapped under the overhang would deform the overhang slightly and non-returnably during its passage. This was found to restore the output of the molding machine substantially to normal expected values, but necessitated a subsequent forming step to give the container mouth its desired ultimate shape with consequent greatly increased cost.

An object of the present invention is to provide for rapidly molding an undercut workpiece from resilient thermoplastic material in such a way that a trapped mold part may be stripped from its molding position without delay and without necessity for reforming the overhanging portions of the workpiece after stripping.

In particular it is an object of the present invention to provide for molding a container head having an inturned applicator-retaining lip in such manner that the containers can be turned out at high speed without the necessity for reforming the lip after the mold parts initially forming the undercut portions have been withdrawn.

According to the present invention the foregoing objects are achieved by arranging the approach path of the injected plastic material to lie at that side of the injected article opposite to or at least remote from the portions of the mold having the undercut configuration. In particular, when the molded article is a container head, the softened plastic is arranged to approach the container head mold cavity through the tube which will ultimately form the container body and to which the head will be welded as it is molded. By this novel approach to the problem it becomes possible to provide enhanced cooling facilities in the region of the undercut portion to speed up its setting action, without in any way interfering with injection temperatures required, to provide a radically improved cycle of operation for the injection machine.

Another object of this invention is to provide for the complete and rapid injection molding of relatively long shell-shaped articles of thin cross-section heretofore difficult or impossible to mold when thermoplastics rather viscous in their softened condition, such as polyethylene, are employed. This object is achieved in an effective manner by arranging for the introduction of the softened plastic material into the mold cavity by a path which leads interiorly of the shell and joins the cavity in an all-around fashion substantially midway of its length so that points in the cavity remote from the introduction area will be substantially equidistant therefrom and all parts of the cavity will be filled at about the same time.

Additional features and advantages will appear hereinafter as the description proceeds.

In the drawing:

FIG. 1 is an elevational section of a portion of an injection molding machine according to the present invention, showing the mold at the injection station and the parts in injecting position but with the injection box unfilled.

FIG. 2 is an elevation of the device of FIG. 1 showing the parts in a different position at the injection station.

FIG. 3 is a partial section taken substantially on line 3—3 of FIG. 2.

FIG. 4 is a section showing the central portion of FIG. 1 to a larger scale, and showing the parts after injection is complete.

FIG. 5 is a view similar to FIG. 4, but showing the mold removed from the injection station and the parts in a different position.

FIG. 6 is a view similar to FIG. 5, but illustrating a still different position of the parts.

FIGS. 7 to 10 are diagrammatic elevations showing the sequence of operations of the parts of the device of FIGS. 1 to 6.

Referring to the drawing, numeral 11 represents an injection molding machine, the injection station of which is shown in FIG. 1. The machine comprises an injection box 13 equipped with a nozzle 15 for introducing softened plastic material under pressure into each of a series of molds as they are carried into position thereunder by a suitable conveying means such as the indexable table 17. A mold 19 is shown in the said injection position wherein it is raised into contact with the injection nozzle 15 by a plunger 21. In general outline the parts described so far are similar to those illustrated in United States Patent No. 2,883,706, issued April 28, 1959, to Albert Quinche et al., on a Rotary Injection Molding Machine for Plastic Collapsible Tubes, and operate in similar fashion.

According to the present invention, the mold 19 includes a female matrix assembly 23 cooperating with a male die 25. In the molding of container heads as described in the said patent, softened plastic material was introduced into the mold cavity from the direction of the container head, and for normal purposes this has proved very convenient and effective. It will be noted however that the present arrangement provides for introducing softened plastic material into the mold cavity from the direction of the container body, with the head end directed away from the injection nozzle for reasons which will presently appear.

Thus, the matrix assembly comprises a housing 27 embodying a recess 29 having a central bulbous protuberance 30 which combines with the recess 29 to provide a mold socket shaped to form the extremity of a container head, in this instance a head having an inturned lip constituting an overhanging portion which must later be stripped from the mold. Adjacent the recess 29 is a conical cam surface 31 designed for cooperation with complementary cam surfaces on a set of spreadable segmental mold parts 33. These mold parts are normally held spread by interacting compression springs 35, but are caused to come together and form a portion of the mold, in this instance the portion forming the threaded neck of the container, when urged against the cam surface 31 by any suitable means. Because these mold parts are now so frequently used to form threads on container necks, they have come to be called "thread plates" and will be so referred to hereinafter, although it will be understood that their application to the formation of ridged or irregular outer surfaces of other sorts is not excluded by reason of this terminology. A detailed discussion of the construction and operation of devices of this character is found in U.S. Patent No. 2,812,548, issued November 12, 1957, to Albert Quinche et al., on a Mold for Plastic Collapsible Containers.

The matrix assembly further comprises a sleeve 37 slidably fitting the upper portion of the housing 27. The inner end of the sleeve 37 is designed for operating engagement with the upper surface of the thread plates 33, and the interior surface of the sleeve has, in part at least, the shape of the exterior of a container body, including especially a surface section 39 (FIG. 4) which shapes the exterior of the container shoulder as will hereinafter appear.

The sleeve 37 carries slide rods 41 having feet 43 and passing through an apertured flange 45 on the exterior of the housing 27. Between the flange 45 and the foot 43 of each slide rod is a stiff compression spring 47. The springs 47 serve to urge the sleeve 37 into the housing 27, and thus normally hold the thread plates 33 in closed position in opposition to the relatively light spring pressure of springs 35 tending to spread them. Feet 43 may also serve as support points for the matrix on table 17 when in lowered position.

The male die 25, seen perhaps most clearly in FIGS. 9 and 10, has at its extremity an exterior contour designed to form the inner surface of a desired container head and to cooperate with the recess 29, protuberance 30, thread plates 33 and surfaces 39 of sleeve 37 in forming a substantially closed mold space into which softened plastic material may be injected to form the head. In the form of the invention illustrated the body of the container is shown as consisting of a preformed tube T of plastic material to which the head is welded during the injection process. The dimensions of the sleeve 37 and the die 25 are such that the tube T fits snugly therebetween and completes the actual closing of the mold space. Preferably the tube T will be of a length to extend down onto surfaces 39 when forced into place, thus giving an improved shoulder bond and unique appearance to the finished container.

The interior of the die 25 is formed to provide a socket 46 designed to receive the injection nozzle 15 and allow it to extend through a major portion of the length of the die to approach to a location not too remote from the mold cavity into proximity with the container head. The socket 46 is, however, somewhat larger in size than the exterior of the nozzle so as to provide for maintaining the nozzle in effective heat insulated relation to the die, or in other words avoid conductive side-wall contact therewith and provide an insulating air chamber 48 which will prevent excessive cooling of the nozzle during injection, and thus prevent the danger of freezing or excessively increasing the viscosity of the plastic material therein. Leading from the inner end of socket 46 is a sprue passage 46a through which the softened plastic material may be injected from nozzle 15 into the mold cavity. Preferably the die 25 also includes a minor cooling chamber 50 located adjacent and inside the shoulder portion of the finished tube to assist in setting the plastic material once injected. The chamber 50 may be served by suitable lead passages 52 and 54 connected to inlet and outlet lines 56 and 58 respectively.

Normally merging into the upper surface of the protuberance 30 is the end of an ejection plunger 49 which is slidable in the housing 27 and which may be raised and lowered when desired, for example by means of a piston 51 slidable in a cylinder bore 51a and acted upon by fluid pressure from supply line 53. In the form shown pressure in the supply line 53 will cause the plunger to rise and eject a completed container from the matrix, and venting of the supply line will allow the weight of the piston 51 to return the plunger to normal position.

One of the novel features of the present invention is the manner in which cooling of the critical portions of the mold charge can be so readily effected. It will be noted that adjacent the recess 29 there is no interference to the placement in housing 27 of large cooling facilities which take the form of a cooling water chamber 60 served by inlet and outlet lines 55 and 57 respectively (FIG. 3).

The operation of the device of the present invention is as follows. With the parts as shown in FIGS. 1 and 7 (it being understood that a preformed plastic tube T has first been placed on the die 25) softened plastic material is forced from the nozzle 15 through the sprue passage 46a and into the mold cavity defined by the die 25, matrix 23 and the plastic tube (see FIG. 4). It will be noted that the parts are so arranged that the plastic material preferably enters the mold cavity about midway of its length so as to avoid delay in spreading through the narrow spaces required for the present article. Almost at once the plastic material begins to congeal by reason of the large cooling effect available due to the chamber 60. It will be noted that lip portion of the container head, designated L, is as remote as possible from the source of heated plastic. Thus the plastic material forming the same has had an opportunity to cool somewhat during its progress into final poition, and once in place is rapidly cooled to resilient condition by the activity of the cooling facility 60. Moreover, the latter while positioned to promptly affect the lip portion L is also as remote as possible from the nozzle 15 where the thermoplastic material must be maintained in a fluent condition. At this time injection pressure is cut off and the plunger 21 is retracted, allowing the matrix 23 and die 25 to recede from the nozzle 15 and finally rest upon table 17 through the medium of feet 43 as seen in FIG. 2 and the cooling of the injected material is allowed to continue. This cooling may take place at one or more stations on the machine as the table 17 is indexed, the parts standing in the position shown in FIG. 8. It will be understood, however, that when the lip portions L have reached a resilient condition, which occurs very rapidly in the circumstances described, unmolding of the completed container, designated C, may commence at once, regardless of whether the other portions of the container head are fully set or not.

When the cooling has proceeded to the prescribed extent the mold enters a station wherein the die 25 is extracted by fingers 59 (FIGS. 9 and 10). The tube T, being welded to the newly molded head, is retained in place by its interengagement with the still contracted thread plates 33, with the parts being as shown in FIG. 9. Then, at this same station, another set of fingers 61 engages a suitable flange 63 at the base of the housing 27 and draws the same downwardly a predetermined amount to the position shown in broken lines in FIG. 9. The enlarged interior view under these conditions is seen in FIG. 5 wherein it is apparent that there has been a slight but sufficient separation of the housing 27 from the sleeve 37 against the force of springs 47 to permit the thread plates 33 to spread, and the shoulder portion 39 of the sleeve has acted to strip the lip portion L of the container C from beneath the protuberance 30. Thereafter, piston 51 and plunger 49 are actuated to eject the container altogether from the mold as seen in FIG. 10, whereupon the lip L thereof reassumes its intended molded configuration. The start of the ejecting motion of plunger 49 is shown in enlargement in FIG. 6.

The plunger 49 is then retracted and the fingers 61 allow return of the housing 27 to normal position, closing the threadplates 33. The container may then be rendered more complete, if desired, by cutting out the sprue to provide communication between the container interior and the chamber in which a dispensing element is to be mounted. A new preformed tube T can now be placed on die 25 which is then returned to its position in sleeve 37. After indexing to the injection station, the mold assembly 19 is raised into engagement with the nozzle 15 by plunger 21 as in FIGS. 1 and 7 and a new cycle is started, it being understood of course that each of several positions around the table 17 may carry its separate mold assembly 19 which passes through its own similar cycle in turn.

From the foregoing description it can be seen that I have provided a novel and effective process and means for molding parts which have overhang portions requiring forceable stripping from the mold, and that the unusual positioning of the undercut portions of the mold cavity with respect to the direction of approach of the heated plastic material lays open avenues of cooling application for rapid congealing of the plastic in the critical overhang portions, whereby the molding cycle can be drastically shortened without the danger of detrimental deformation of the overhang portions during stripping. It can also be seen that the arrangement and steps are exceptionally well adapted to the molding of thermoplastic container heads having overhanging or undercut portions for retaining in place at the mouth of the container a suitable dispensing applicator such as a sponge, absorbent pad, or ball, and for producing products of this character at high speeds consistent with economical commercial operation.

While in order to comply with the statute the invention is described in language which is rather specific as to structural features and arrangements, it is to be understood that the invention is not limited to the specific details shown, but that the means herein disclosed comprises the preferred of several modes of putting the invention into effect, and the invention is therefore claimed in any of its forms or modifications within the scope of the language employed in the appended claims.

Having described the invention, what is claimed is:

1. The method of making a molded thermoplastic article of the type having overhanging portions at one end thereof with an adjacent undercut configuration requiring forcible stripping of the finished article from a mold, which comprises providing a mold having a cavity of the shape required to produce the article including undercut-forming portions; introducing softened thermoplastic material under pressure into the mold by a nozzle which approaches the mold in such a way that the plastic material enters the mold cavity from a direction opposite to that in which the overhanging portion will project from the body of the finished article; rapidly cooling the portions of the mold cavity in the immediate vicinity of the overhang-forming portions to render them into a firm and resilient part of the finished article by bringing large quantities of cooling agent rapidly into heat conductive proximity with said mold cavity portions, and promptly stripping the overhanging portions of the set plastic article free of said undercut-forming portions of the mold.

2. The method of making a thermoplastic container of the type having a preformed body and an injection molded head thereon which comprises providing a die for forming internal portions of said head; placing a said preformed thermoplastic tube over said die; placing over the end of said die and tube a matrix cooperating therewith to define a mold cavity for forming the head; inserting an injection nozzle into said die and through the major portion of its length into proximity with said head, while maintaining said nozzle in effective heat insulated relation to the die, injecting softened thermoplastic material into said mold cavity through said die; and cooling said matrix by passing coolant therethrough at locations closely adjacent the outer surface of the head under conditions of location and temperature such that the cooling effect is in excess of that which would be usable if injection into said cavity took place through said matrix to rapidly cool and set the thermoplastic material of the molded head.

3. The method of making a thermoplastic container of the type having a preformed body and an injection molded head thereon, and in which the head includes overhanging portions with an adjacent undercut configuration near the extremity remote from the body, which comprises providing a matrix having undercut forming portions for forming the external surfaces of said head and a die cooperating with said matrix to define a mold cavity for forming the head; injecting molten thermoplastic material into said mold cavity from the direction of the interior of the container body; and simultaneously cooling said matrix by passing a coolant therethrough at locations closely adjacent the overhanging portions of the head to rapidly cool the plastic material of the overhanging portions and render the same resilient; and stripping the overhanging portions of the container head free from the undercut forming portions of said matrix.

4. An article molding device for producing molded thermoplastic articles of the type having overhanging portions at one end thereof, comprising a mold providing a mold cavity and having undercut-forming portions therein; means for introducing softened thermoplastic material of normally resilient character into the mold cavity from a direction opposite to that occupied by the overhanging portions; means for conducting a coolant in quantity into close proximity to said overhanging forming portions for rapidly cooling the same and setting a said plastic article to a relatively resilient condition; and means for subsequently stripping the molded overhanging portion of the article free of said undercut forming portions of the cavity by forcibly pushing the article axially away from the undercut-forming portions and towards the direction from which plastic introduction was effected.

5. An article molding device for producing molded thermoplastic articles of the type having overhanging portions of one end thereof, comprising a mold providing a mold cavity and having undercut-forming portions therein; means for introducing softened thermoplastic material of normally resilient character into the mold cavity from a direction opposite to that occupied by the undercut portions; means for conducting a coolant in quantity through said mold and into close proximity to said undercut portions for rapidly cooling the same to resilient condition substantially simultaneously with said plastic introduction, but without detrimentally effecting the softened nature of the plastic material in the introduction means; and means for subsequently stripping the overhanging portion of the molded article free of said undercut forming portions of the cavity by forcibly pushing the article away from the under-cut forming portions and towards the direction from which plastic introduction was effected.

6. A device as set forth in claim 4 in which the mold cavity providing means includes a female matrix and a cooperating male die, in which the plastic introduction means operates through and incorporates portions of the die, and in which the coolant conducting means operates through and incorporates portions of the matrix.

7. A device as set forth in claim 6 in which the matrix includes a plurality of relatively movable parts slidably mounted one upon the other to be transportable as a unit and resiliently held in compact mold-forming relationship, but forcibly spreadable to assist in unmolding.

8. A device as set forth in claim 7 in which the matrix comprises a housing having a portion of the mold cavity therein and a cam surface surrounding the same, projection-forming elements resiliently urged apart and cooperable with the cam surface when urged thereagainst to form another portion of the mold surface, and pusher means connected to and resiliently urged into said housing and against said elements normally to hold the parts in mold-forming position.

9. A device as set forth in claim 8 including means for forcibly separating said pusher means and said housing against the resilient urging thereof to permit spreading of said elements therebetween.

10. A device as set forth in claim 8 in which said pusher means is a sleeve providing for entry of said die within the matrix.

11. A device as set forth in claim 6 in which said plastic introducing means includes an elongate nozzle, and in which said die is shaped to provide a socket for receiving said nozzle and of a size to have its side walls significantly spaced therefrom to effectively maintain said nozzle in substantially heat insulated relation with respect to said die.

12. The method of making a molded thermoplastic article of the type having a generally elongate, shell-like thin-walled configuration which comprises providing a mold having a cavity of the shape required to produce the article; and introducing softened plastic material under pressure into the mold by a sprue passage which first leads interiorly of the shell shape and joins the cavity in all-around fashion at a location nearer to the midpoint lengthwise of the completed article than to either end.

13. The method of making a thermoplastic container of the type having a preformed body and an injection molded head thereon, and in which the head includes overhanging portions near the extremity remote from the body, which comprises providing a matrix having undercut forming portions for forming the external surfaces of said head including the overhanging portions thereof and a die cooperating with said matrix to define a mold cavity for forming the head; injecting molten thermoplastic material into said mold cavity from the direction of the interior of the container body and so as to enter said cavity at a level substantially midway of the length of the container head; cooling said matrix by passing a coolant therethrough at locations closely adjacent the overhanging portions of the head to rapidly cool the plastic material of the overhanging portions and render the same resilient; and stripping the overhanging portions of the container head free from the undercut forming portions of said matrix.

14. Molding equipment including a male die and a cooperable female matrix assembly for making a molded hollow plastic article having exterior projecting portions requiring spreading of the matrix assembly to unmold the finished work, said matrix assembly being made up of a plurality of relatively movable parts slidably assembled to one another so as to be transportable as a unit, and movable between one relative position in which the matrix assembly parts are in compact mold-forming condition and another relative position in which they are in spread work-release condition, resilient means carried by the matrix assembly and acting on the parts to urge them towards said one relative position, and control means on the matrix assembly and operable exteriorly thereof independently of the insertion or withdrawal of said male die to overcome the effect of said resilient means and cause movement of the matrix assembly parts to said other relative position to permit unmolding.

References Cited in the file of this patent

UNITED STATES PATENTS

| | | |
|---|---|---|
| 2,396,406 | Anderson | Mar. 12, 1946 |
| 2,483,093 | Harvey | Sept. 27, 1949 |
| 2,812,548 | Quinche et al. | Nov. 12, 1957 |
| 2,923,975 | Voumard et al. | Feb. 9, 1960 |

FOREIGN PATENTS

| | | |
|---|---|---|
| 996,114 | France | Aug. 29, 1951 |
| 314,978 | Switzerland | July 15, 1956 |